US005455932A

United States Patent [19]

Major et al.

[11] Patent Number: 5,455,932
[45] Date of Patent: Oct. 3, 1995

[54] FAULT TOLERANT COMPUTER SYSTEM

[75] Inventors: Drew Major; Kyle Powell; Dale Neibaur, all of Orem, Utah

[73] Assignee: Novell, Inc., Orem, Utah

[21] Appl. No.: 964,077

[22] Filed: Oct. 20, 1992

Related U.S. Application Data

[63] Continuation of Ser. No. 586,807, Sep. 24, 1990, Pat. No. 5,157,663.

[51] Int. Cl.$^6$ .................................................. G06F 11/34
[52] U.S. Cl. ...................... 395/489; 395/494; 395/184.01
[58] Field of Search ........................... 371/9.1, 8.1, 8.2, 371/12, 47.1, 46; 364/290 MS, 268.3 MS, 268.9 MS, 699.2 MS; 395/575 MS, 550

[56] References Cited

U.S. PATENT DOCUMENTS

| | | | |
|---|---|---|---|
| 4,471,429 | 9/1984 | Porter et al. | 364/200 |
| 4,530,052 | 7/1985 | King et al. | 364/200 |
| 4,615,001 | 9/1986 | Hudgins, Jr. | 364/200 |
| 4,658,351 | 4/1987 | Teng | 364/200 |
| 4,941,087 | 7/1990 | Kap | 364/200 |
| 4,959,768 | 9/1990 | Gerhart | 364/187 |
| 4,979,108 | 12/1990 | Crabbe, Jr. | 364/200 |

*Primary Examiner*—Robert W. Beausoliel, Jr.
*Assistant Examiner*—Phung M. Chung

*Attorney, Agent, or Firm*—Snell & Wilmer; Michael K. Kelly; Daniel J. Noblitt

[57] ABSTRACT

A method and apparatus for providing a fault-tolerant backup system such that if there is a failure of a primary processing system, a replicated system can take over without interruption. The invention provides a software solution for providing a backup system. Two servers are provided, a primary and secondary server. The two servers are connected via a communications channel. The servers have associated with them an operating system. The present invention divides this operating system into two "engines." An I/O engine is responsible for handling and receiving all data and asynchronous events on the system. The I/O engine controls and interfaces with physical devices and device drivers. The operating system (OS) engine is used to operate on data received from the I/O engine. All events or data which can change the state of the operating system are channeled through the I/O engine and converted to a message format. The I/O engine on the two servers coordinate with each other and provide the same sequence of messages to the OS engines. The messages are provided to a message queue accessed by the OS engine. Therefore, regardless of the timing of the events, (i.e., asynchronous events), the OS engine receives all events sequentially through a continuous sequential stream of input data. As a result, the OS engine is a finite state automata with a one-dimensional input "view" of the rest of the system and the state of the OS engines on both primary and secondary servers will converge.

8 Claims, 6 Drawing Sheets

FAULT TOLERANT COMPUTER SYSTEM

This is a continuation of patent application Ser. No. 586,807, filed on Sep. 24, 1990, now U.S. Pat. No. 5,157,663.

BACKGROUND OF THE INVENTION

1. Field of the Invention

This invention relates to the field of operating system software-based fault-tolerant computer systems utilizing multiple processors.

2. Background Art

In computer system applications, it is often desired to provide for continuous operation of the computer system, even in the event of a component failure. For example, personal computers (PC's) or workstations often use a computer network to allow the sharing of data, applications, files, processing power, communications and other resources, such as printers, modems, mass storage and the like. Generally, the sharing of resources is accomplished by the use of a network server. The server is a processing unit dedicated to managing the centralized resources, managing data, and sharing these resources with client PC's and workstations. The server, network and PC's or workstations combined together constitute the computer system. If there is a failure in the network server, the PC's and workstations on the network can no longer access the desired centralized resources and the system fails.

To maintain operation of a computer system during a component failure, a redundant or backup system is required. One prior art backup system involves complete hardware redundancy. Two identical processors are provided with the stone inputs at the hardware signal level at the same time during operation of the computer system. Typically, one processor is considered the primary processor and the other is a secondary processor. If the primary processor fails, the system switches to the secondary processor. An example of such a hardware redundancy system is described in Lovell, U.S. Pat. No. 3,444,528. In Lovell, two identical computer systems receive the same inputs and execute the same operations. However, only one of the computers provides output unless there is a failure, in which case the second computer takes control of the output. In operation, the output circuits of the backup computer are disabled until a malfunction occurs in the master computer. At that time, the outputs of the backup computer are enabled.

The use of identical processors or hardware has a number of potential disadvantages. One disadvantage is the complexity and cost of synchronizing the processors at a signal level.

Another prior art method of providing a backup system is referred to as a "checkpoint" system. A checkpoint system takes advantage of a principle known as "finite state automata." This principle holds that if two devices are at the same state, identical inputs to those devices will result in identical outputs for each device, and each device will advance to the same identical state.

In a checkpoint system, the entire state of a device, such as the processor state and associated memory, is transferred to another backup processor after each operation of the primary processor. In the event of a failure, the backup processor is ideally at the most recent valid state of the primary processor. The most recent operation is provided to the backup processor and operation continues from that point using the backup processor. Alternatively, the state information is provided to mass storage after each operation of the primary processor. In the event of a failure, the stored state information is provided to a backup processor which may or may not have been used for other operations prior to that event.

One prior art checkpoint system is described in Glaser, U.S. Pat. No. 4,590,554. In Glaser, a primary processor is provided to perform certain tasks. A secondary processor is provided to perform other tasks. Periodically, the state of the primary processor is transferred to the secondary processor. Upon failure of the primary processor, any operations executed by the primary processor since the last synchronization of the primary and backup processors are executed by the backup processor to bring it current with the primary processor. The system of Glaser, as well as other checkpoint systems, suffer a number of disadvantages. One disadvantage is the amount of time and memory required to transfer the state of the primary system to the secondary system. Another disadvantage of checkpoint systems is the interruption of service upon failure of the primary system. The secondary system must be "brought up to speed" by execution of messages in a message string.

One prior art attempt to solve this problem is to update only those portions of the state of the primary system that have been changed since the previous update. However, this requires complex memory and data management schemes.

It is an object of the invention to provide a backup system that does not require specialized hardware for the synchronization of the backup system.

It is another object of the invention to provide a backup system which is transparent to asynchronous events.

It is still another object of the present invention to provide an improved backup system for network server operation.

It is another object of the present invention to provide continuous service through a single hardware component failure.

SUMMARY OF THE INVENTION

The invention is a method and apparatus for providing a fault-tolerant backup system such that if there is a failure of a primary processing system, a replicated system can take over without interruption. The primary and backup processing systems are separate computers connected by a high speed communications channel. The invention provides a software solution for synchronizing the backup system. The present invention is implemented as a network server, but the principles behind the invention could be used in other processing environments as well. Each server may utilize one or more processors. The servers use a specially architected operating system. The present invention divides this operating system into two "engines." An input/output (I/O) engine is responsible for handling and receiving all data and asynchronous events on the system. The I/O engine controls and interfaces with physical devices and device drivers. The operating system (OS) engine is used to operate on data received from the I/O engine. In the primary server, these engines are referred to as the primary I/O engine and the primary OS engine.

All events or data which can change the state of the operating system are channeled through the I/O engine and converted to a message format. The messages are provided to a message queue accessed by the OS engine. Therefore, regardless of the timing of the events, (i.e., asynchronous events), the OS engine receives all events sequentially through a continuous sequential stream of input data. As a result, the OS engine is a finite state automata with a one-dimensional input "view" of the rest of the system. Thus, even though the OS engine is operating on asynchronous events, the procession of those events is controlled through a single-ordered input sequence.

On startup, or when a secondary processor is first provided, the primary processor is "starved," that is, all instructions or other state-changing events are halted until the OS engine reaches a stable state. At that point, the state is transferred to the OS engine of the backup system. From that point on, identical messages (events) are provided to each. OS engine. Because both systems begin at an identical state and receive identical inputs, the OS engine part of the systems produce identical outputs and advance to identical states.

The backup system also divides the operating system into a secondary OS engine and a secondary I/O engine. The secondary I/O engine is in communication with the primary I/O engine. Upon failure of the primary system, the remainder of the computer system is switched to the secondary system with virtually no interruption. This is possible because each event is executed substantially simultaneously by the backup system and the primary system. Thus, there is no loss of system operation during a component failure. In addition, no transfer of state is required once initial synchronization has been achieved. This reduces system complexity, reduces memory managing requirements and provides for uninterrupted service.

DETAILED DESCRIPTION OF THE INVENTION

A fault-tolerant system used as a network server is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Block Diagram of this Invention

Figure 1:
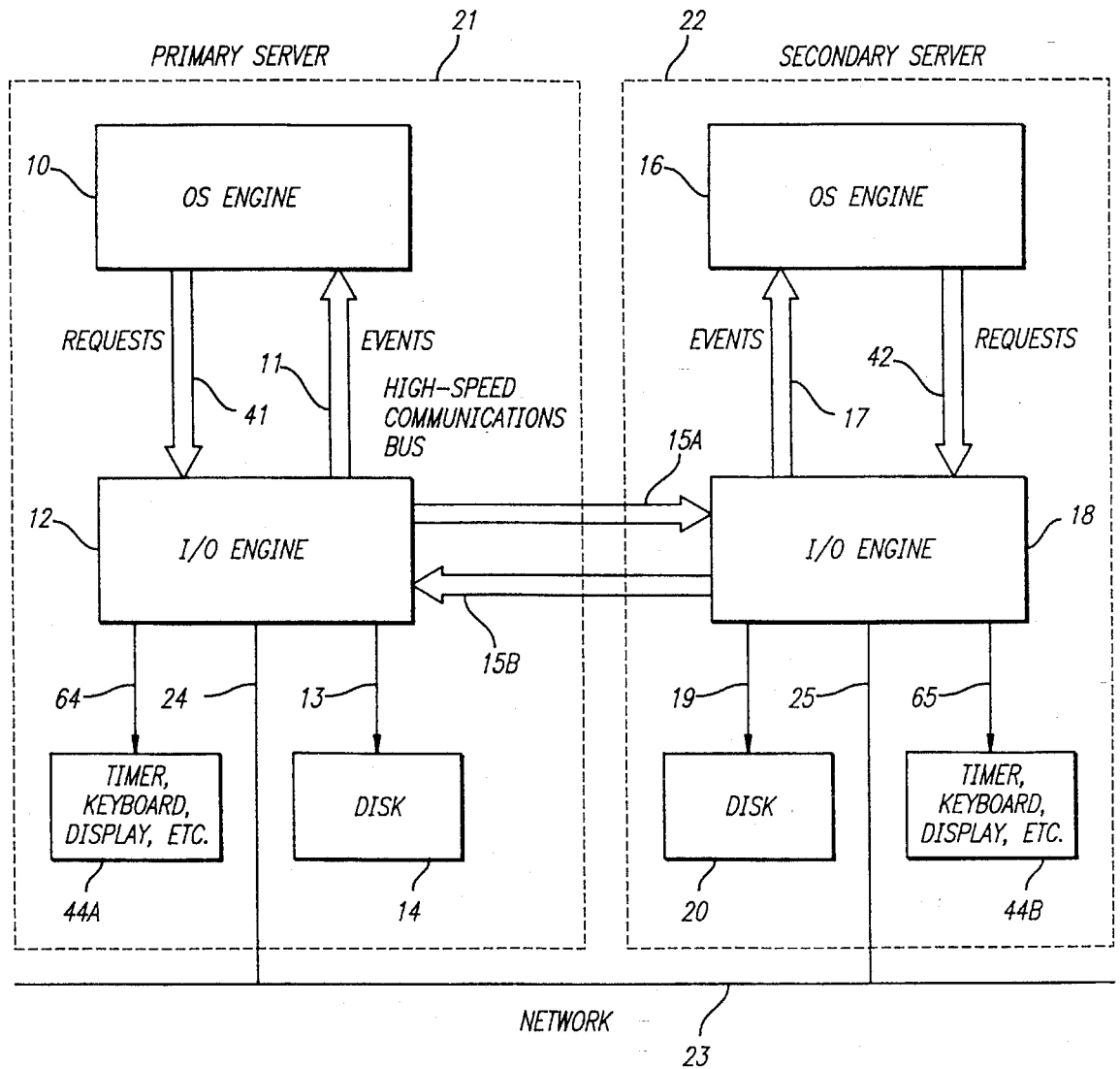
FIG. 1 is a block diagram of the preferred embodiment of the present invention.

A block diagram of the preferred embodiment of this invention is illustrated in FIG. 1. The invention provides a primary processor and operating system generally designated by those elements within dashed lines 21 and a backup or secondary processor and operating system generally designated by those elements falling within dashed lines 22. The primary operating system 21 comprises an operating system (OS) engine 10 coupled to an input/output (I/O) engine 12. The I/O engine and OS engine communicate via "event" and "request" queues. The I/O engine writes events onto the event queue and the OS engine reads the events. The OS engine writes requests onto the request queue and the I/O engine reads the request.

The backup 22 includes its own OS engine 16 that communicates through event queue 17 and request queue 42 to I/O engine 18. I/O engine 12 communicates with I/O engine 18 through a high speed communications bus 15A and B. 15A and B are one hardware channel that is used to communicate two types of messages, A and B. The high speed communications bus is used to transfer events from the primary server to the secondary server (15A). It is also used for other communication between the I/O engines (15B). I/O engine 12 also may access mass storage 14 through line 13. I/O engine 12 is also coupled to other devices, such as timers, keyboards displays, etc., shown symbolically as block 44A coupled to I/O engine 12 through bus 64. I/O engine 18 is coupled through line 19 to mass storage 20. The I/O engine 12 and I/O engine 18 are each connected to network 23. I/O engine 18 is coupled to block 44B (timers, keyboards, display, etc.) through bus 65.

The I/O engine 12 receives data and asynchronous events from the computer system of which it is a part. For example, if the invention is used as a network server, the I/O engine 12 receives LAN packets from other devices coupled to the network. The I/O engine also controls and interfaces with physical devices and device drivers, such as mass storage device 14, a keyboard or a timer.

The OS engines operate on data received from the I/O engines via the event queues 11 and 17. After a desired operation has been performed, the data is returned to the I/O engines via the request queues 41 and 42 for output to other system devices.

The primary server 21 receives data or events from the network 23 on input line 24. The I/O engine 12 converts these events or data into a "message" format. Each message represents data or an event which can change the state of the operating system. The I/O engine 12 provides these messages first to bus 15A, and when I/O engine 18 signals that it has received the message, the message is then given by I/O engines 12 and 18 to both the OS engines through the event message queue buses 11 and 17. These messages are executed sequentially by OS engines 10 and 16. By queueing the messages, time dependency is removed from the system so that all asynchronous events are converted into a synchronous string of event messages. By separating the OS engine from the I/O engine, the OS engine is made to operate as if it were a finite state automata having a one dimensional view of the system (i.e., the event message queue).

The buses 15A and 15B linking the primary I/O engine 12 to the secondary I/O engine 18 utilize a bi-directional communications channel. Ideally, the buses 15A and B provide high speed communications, have low latency and low CPU overhead. Any suitable communications channel can be utilized with this invention, including bus extenders and local area network (LAN) cards.

The OS engine and I/O engine can be implemented with a single processor if desired. Alternatively, separate processors, one for the OS engine and one for the I/O engine, can be utilized. Additional OS engines, using additional processors, can also be utilized in this invention. The states of all OS engines are then mirrored.

Regardless of whether one or two processors is utilized for the OS engine and I/O engine, system RAM memory is divided between the two engines. The I/O engine can access OS engine memory but the OS engine cannot access I/O engine memory. This is because memory buffer addresses may be different for the primary and secondary I/O engines, leading to the state of the primary and secondary OS engines becoming different if they were allowed to access addresses in I/O engine memory.

It is not necessary for the primary and backup servers to have identical processors. The performance of the processors should be similar (CPU type, CPU speed) and the processors must execute instructions in the same manner, not necessarily at the pin and bus cycle level but at the values written to memory and the instruction sequencing level. For example, an 80386 microprocessor manufactured by Intel Corporation of Santa Clara, Calif., could be used in the primary server with an Intel 80486 in the secondary server. The secondary engine is required to have at least as much RAM as is being used by the primary OS engine. In addition, both the primary and secondary servers should have the same amount and configuration of disk storage.

Hardware and/or software upgrades and changes can be made to the system without loss of service. For example, a user may wish to add more RAM to the primary and secondary servers. To accomplish this, the primary or secondary server is taken out of the system. If the primary server is taken off line, the secondary server will treat that occurrence as a failure and will begin to operate as the primary server, such that there is no disruption or interruption of the operation of the system. The off-line server can then be upgraded and placed back on-line. The servers are then resynchronized and the other server is taken off line and upgraded. After upgrade of the second server, it is placed back on-line and the servers are resynchronized and both start using the newly added RAM. Thus, hardware and software upgrades can be made without loss of service. Although the invention is described in relation to network servers, it has equal application to general purpose computer systems.

To initialize the secondary operating system, all new events are withheld from the primary OS engine 10 until it has reached a stable state. At that point, the state of the OS engine 10 (embodied in the memory image of the OS engine 10) is transferred through message bus 15B to the OS engine 16 of the backup operating system. The OS engine 10 then has a state identical to OS engine 16. At this time, all messages generated by I/O engine 12 that are provided to OS engine 10 are also provided on bus 15A to I/O engine 18 for transfer to OS engine 16. Since both OS engines 10 and 16 begin in an identical state and receive identical inputs, each OS engine will advance to an identical state after each event or message.

In the present invention, identical messages produce identical states in the primary and backup operating system engines, such that prior art check-pointing operations are not required. Time dependent considerations are minimized, and synchronization of the respective OS engines for simultaneous operation is unnecessary because synchronous and asynchronous events are provided to a message queue, the message queue serving as a method to convert asynchronous events to synchronous events.

If there is a failure of a primary system, the I/O engine 18 of the secondary operating system is coupled to the network 23. The secondary I/O engine 18 is then used to generate messages which are provided to the secondary OS engine 16. Because the backup operating system is at the same state as the primary operating system, no loss of operation to the clients using the server occurs during a server switchover.

I/O Engine/OS Engine Separation

In the present invention, the I/O engine and OS engine are substantially logically independent. To prevent unwanted state changes that cannot be mirrored on the backup OS engine, data shared by the I/O and OS engines is controlled, as further described below. Each engine has its own standalone process scheduler, command interpreter, memory management system, and code associated with that portion of the OS essential to its function.

The division between the OS engine and I/O engine is made above the hardware driver level at the driver support layer. The driver support layer software is duplicated in both the I/O engine and the OS engine and maintains the same top-level interface. The support layer software is modified for the I/O engine and the OS engine. The driver support layer of the I/O engine maintains driver level interfaces and communicates to physical hardware drivers. It converts hardware driver level events into messages which are provided to the event queue of the OS engine.

The OS engine has no hardware driver interface support routines, such as for registering interrupts or allocating I/O port addresses. When the OS engine requests an operation involving a hardware component (e.g., writing or reading from disk), the driver support layer software in the OS engine converts the action into a request and provides it to the I/O engine request queue for execution. The results of that request are then returned to the OS engine as an event message generated by the I/O engine driver support layer.

I/O ENGINE

Figure 2:
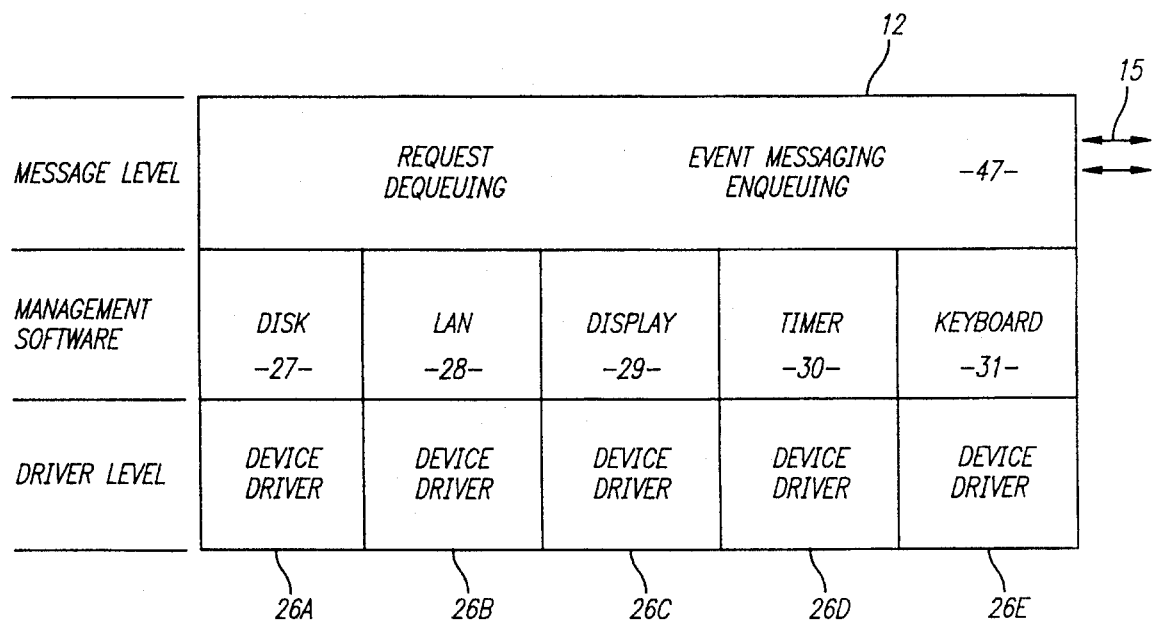
FIG. 2 is a detailed view of the I/O engine of FIG. 1.

Referring now to FIG. 2, the I/O engine consists of three levels, a driver level, a management software level and a message level. Device drivers 26A–26E drive hardware elements such as printers, storage devices (e.g., disk drives), displays, LAN adaptors, keyboards, etc. The management software level includes controllers for device drivers. For example, the disk block 27 controls the disk device driver (e.g., disk device driver 26a). Disk block 27 controls the initiation of disk reads and writes. In addition, disk block 27 tracks the status of a disk operation. The disk block 27 of the primary I/O engine (i.e., I/O engine 12) communicates the status of disk operations to the backup I/O engine. The primary mass storage 14 and the secondary mass storage 20 are substantially identical systems. If the primary I/O engine executes a read from disk 14, it communicates to I/O engine 18 that the read has been completed. If the primary I/O engine completes the read first, the data may be sent as a message on bus 15B to the secondary I/O engine 18. Alternatively, I/O engine 18 reads the data from its own disk drive 20.

The LAN block 28 controls external communications such as to a local area network. This invention is not limited to local area networks, however, and any type of communication may be utilized with this invention. The LAN controller receives information packets from the network and determines whether to provide that packet to the OS engine.

The display block 29 controls communications to a display device such as a CRT screen through device driver 26C. The timer block 30 drives the system time clock and keyboard block 31 provides an interface and communication with a keyboard.

Message block 47 converts system events into messages to provide to the event queue of the OS engine and dequeues requests from the OS engine. A message consists of a header field and a data field. The header field indicates the type of message or operation. The data field contains the data on which the operation is to be executed. The message level communicates event messages with the I/O engines through event bus 15A.

OS Engine

Figure 3:
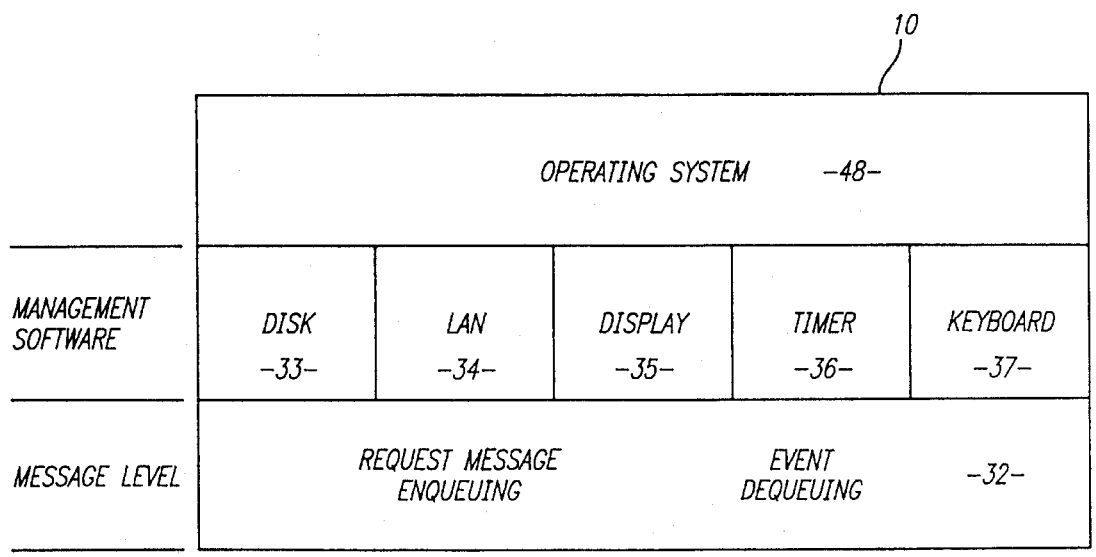
FIG. 3 is a detailed view of the OS engine of FIG. 1.

Referring to FIG. 3, the OS engine includes message level 32 to dequeue event messages received from the I/O engine in sequential order and to enqueue requests to provide OS engine requests to the request block 47 of the I/O engine. The OS engine also includes management software corresponding to the management software of the I/O engine. For example, the OS engine includes disk management software 33, LAN management software 34, message management software 35, timer management software 36 and keyboard software 37. The top level 48 of the OS engine is the operating system of the computer system using this invention.

The disk management software 33 controls the mirrored copies of data on the redundant disks 14 and 20. When a disk operation is to be performed, such as a disk read operation, the disk management software 33 determines whether both I/O engines 12 and 18 will perform a read operation or whether the primary I/O engine 12 will perform a read and transfer the data to the secondary I/O engine 18. The timer management software 36 controls timer events. Generally, an operating system has a timer that is interrupted periodically. Often this timer interruption is used for time dependent operations. In this invention, a timer interrupt is itself an event on the input queue. By turning the timer interrupt into a message, the timer events become relative instead of absolute. Time events are changed from asynchronous to synchronous events. The LAN block 34, display block 35 and keyboard block 37 control network, display and keyboard events, respectively.

Operation

When the OS engine receives an event message, several changes can occur to the state of the OS engine and these changes can take some finite time to occur. In this invention, once a message has been accepted by the OS engine, the OS engine performs all operations that can be performed as a function of the message. After all such operations are performed, the OS engine checks the message queue to determine if another message is available for execution. If there is no other message available, the OS engine becomes inactive until a message is available. This method of operation is required so that the primary OS engine and the second OS engine remain synchronized. New messages can be given to the primary and secondary OS engines at different times because the I/O engines are asynchronous. Therefore, the presence or absence of a new event cannot be acted upon or utilized to change the state of the OS engine.

In the preferred embodiment of the present invention, the OS environment is defined to be non pre-empting. Pre-emption is inherently an asynchronous event. In the prior art, an executing task can be interrupted and replaced by another task by a timer interrupt. Because the present system executes a single message at a time, the timer interrupt or pre-emption request does not affect the OS engine until it reaches that message in the message queue. The task running on the OS engine must relinquish control before the timer event can be received and executed by the OS engine.

Interengine Communication

In the present invention, communication between the OS engine and I/O engine is controlled. The invention is designed to preserve a single source of input to the OS engine, thereby preventing time dependent events and changes made by the I/O engines from affecting the state of the OS engine.

Communication between the I/O engine and OS engine is characterized as follows:

1. The OS engine can only access its own OS engine memory. All communication between the OS engine and the I/O engine must occur in the memory of the OS engine. The OS engine cannot access memory designated as I/O engine memory. Memory coherency is preserved. The primary OS engine and secondary OS engine are mirrored in this invention, but the primary I/O engine and secondary I/O engine are not. Therefore, memory contents of each I/O engine can be different. So long as the OS engines do not access the I/O memory, the state synchronization is maintained.

2. When the OS engine requests that a block of memory be modified by the I/O engine, the OS engine may not access that memory block until the I/O engine sends back an event notifying the OS engine that the modification had been done. The primary and secondary OS engines do not operate in exact synchronization. There may be some skewing and divergence of their operations (although the states always converge). In addition, the primary and secondary I/O engines may modify the OS engine memory at different times. If decisions were then made by the OS engine related to the current value of a memory location in the process of being changed by the I/O engine and the memory locations contain different data due to the different modification times, the synchronization of the states between the two OS engines would be lost.

In actual operation, if the OS engine requires a copy of data from the I/O engine, it allocates a work buffer to hold the data and provides the address of the work buffer to the I/O engine. The I/O engine copies the requested data into the work buffer and generates an event to the OS engine confirming that the data has been placed. The OS engine copies the data from the work buffer to its ultimate destination and releases the work buffer.

3. The I/O engine cannot change memory designated as OS engine memory unless it has been given explicit control over that memory location by the OS engine. Once the I/O engine has transferred control of the OS engine memory back to the OS engine, (via an event) the I/O engine cannot access that memory.

4. The OS engine software cannot "poll" for a change in a memory value without relinquishing control of the processor during the poll loop, because the OS engine cannot be preemptive or interrupt driven in the present implementation. All changes are made via events, and new events are not accepted until the processor is relinquished by the running process.

When the primary server fails, the secondary server becomes the primary server. The address of the OS engine does not change, but messages received from the "network" are rerouted to direct the messages to the secondary server.

Disk Mirroring

The primary storage 14 and the secondary storage 20 must be mirrored for operation of this invention. When a new secondary engine is brought on line, the disk system maps the drives oft the secondary engine to the corresponding drives on the primary engine. The drives on the two engines are marked with a "current synchronization level" counter that can be used to indicate which drive is more current or that two drives are already fully synchronized. If there is any change to the synchronization state (i.e., the other server has failed) the current synchronization level is incremented by the surviving server. The surviving engine also starts tracking memory blocks which are written to disk. When the failed engine comes back on line, after verifying that it has the same media as before, the repaired engine can be resynchronized by transferring over only the memory blocks that were changed while it was out of service. When the system is first brought up and the original primary engine is brought on line, it tracks which disk blocks have been changed for the same reasons.

Primary and Secondary I/O Engine Communication

The I/O engine of the primary system determines the sequence of events provided to the primary OS engine and the secondary OS engine. An event plus any data that was modified in the primary OS engine memory is communicated to the secondary OS engine before the primary OS engine is given the event in its event queue. This communication is over bus 15A. The secondary system's I/O engine modifies the secondary OS engine memory and provides the event to the secondary OS engine.

In addition to communicating events, the primary and secondary I/O engines communicate other information. Mechanisms are provided so that various driver layer support routines can communicate with their counterparts in the other system. This communication is bi-directional and is over bus 15B. Examples of such communication include completion of disk I/O requests and communication of disk I/O data when the data is only stored on one of the systems due to disk hardware failure.

There are two procedures used for communications between the OS engines. "AddFSEvent" is used by the I/O engine to give an event to the OS engine and "MakeIORequest" is called by the OS engine to communicate a request to the I/O engine. AddFSEvent can only be called by the primary I/O engine. Both calls use a request type or event type to identify the request or event being made. In addition, both calls pass a parameter defined in a function-specific manner. For example, it may be a pointer to a data structure in the OS engine memory.

When the primary system I/O engine modifies a data structure in the OS engine, the same modification needs to be made in the secondary OS engine as well before the event can be given to the OS engine. AddFSEvent can be given pointers to data structures in the OS engine that will be transferred to the secondary server along with events to transfer OS engine data modifications to the secondary system.

In the secondary system, there are handler procedures in the I/O engine, one per request type, that are called when events are received from the primary server. The handler procedure is called with the original parameter, and pointers to the areas in the OS engine that need to be modified.

The secondary I/O engine event handler procedures have the option of accepting or holding off the events. Hold off would be used if the event is in response to a request from the OS engine and the secondary system has not got the request yet. If the event wasn't held off, then potentially memory could be prematurely changed in the OS engine. Usually, the event handlers in the secondary I/O engine remove an outstanding request that they have been tracking and signal to accept the event. After the data is copied, the event is given to the secondary OS engine. Note that the secondary system event handlers can do other modifications to OS engine memory if necessary by the implementation.

It is important for the primary I/O engine to wait until the secondary system receives an event before giving the event to the primary OS engine. Otherwise, the primary OS engine could process the event and provide a response before the original event has been transferred to the secondary system (the event could be delayed in a queue on the primary system waiting to be sent to the secondary system). If the primary system generated a request that was a function of the event not yet transferred to the secondary system, then if the primary system failed, its state, as viewed from an external client, would not be synchronized with the secondary system.

Server States of Operation and Transitions

The I/O engine software runs in four states: no server active state, primary system with no secondary state, primary system with secondary state, and secondary system state. In addition, the I/O engine makes the following state transitions: no server active to primary system no secondary, primary system no secondary to primary system with secondary, and secondary system to primary system. There are some additional states that occur during the synchronization of a secondary system.

Figure 5:
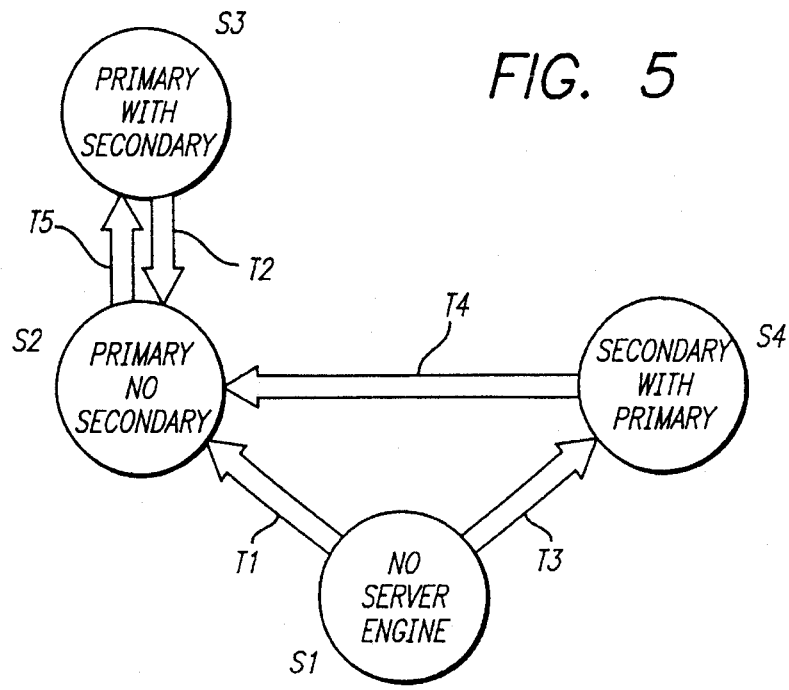
FIG. 5 is a diagram illustrating state transitions of this invention.

The states of the system of this invention are illustrated in FIG. 5. As noted, the I/O engine operates in one of four states S1, S2, S3 and S4. State S1, no server engine, occurs when the I/O engine is operational but the OS engine is not. State 2, primary no secondary, occurs when both the I/O engine and OS engine are loaded, but the system is not mirrored. When the system is mirrored, it will become the primary OS engine and the I/O engine will act as the primary I/O engine.

State 3 is referred to as primary with secondary. In this state, the I/O engine is running in a mirrored primary system. State S4, secondary with primary, occurs when the I/O engine is running in a mirrored secondary system.

There are five possible state transitions that can be experienced by the I/O engine. These are indicated by lines T1–T5. The first transition T1 is from state S1 to state S2. This transition occurs after the OS engine is activated.

The second transition T2 is from state S2 to state S3 and occurs within the primary system when it is synchronized with the secondary system. Transition T3 is from state S1 to state S4 and occurs within the secondary system when the OS engine is synchronized with the primary system.

Transition T4 is from state S4 to state S2 and occurs when the primary system fails. Transition T5 is from state S3 to state S2 and occurs when the secondary system fails.

Secondary Server Tracking and Execution of Requests

The secondary system I/O engine receives requests from its own OS engine but usually does not execute them. Instead, it enqueues the request and waits until the primary I/O system responds to the request, then gets a copy of the response (the Event generated by the primary I/O system), unqueues its own copy of the request and allows the response "event" to be given to its own OS engine.

The secondary I/O engine has to enqueue the requests from the OS engine for several reasons. First of all, the OS engine usually expects some sort of response "event" from every one of its requests. If the primary system fails, then the secondary system (now primary system) completes the request and generates the appropriate response event. Another reason is that the secondary system has to wait until it has received the request before it can approve receiving the response event (a case which can occur if the primary system is significantly ahead of the secondary system), otherwise the secondary system may transfer data to its OS engine that the OS engine is not yet prepared to received. If the secondary system has enqueued the request it will accept the response event; if not it signals the primary system to "hold off" and try again.

There are requests given by the OS engine that may need to be executed by both servers and then have the actual completion "event" coordinated by the primary system. One example of this is disk writes. The secondary system has to signal the primary system when it is done with the request; the primary system waits until it has completed the write and has received completion confirmation from the secondary system before it generates the completion "event."

Figure 4A:
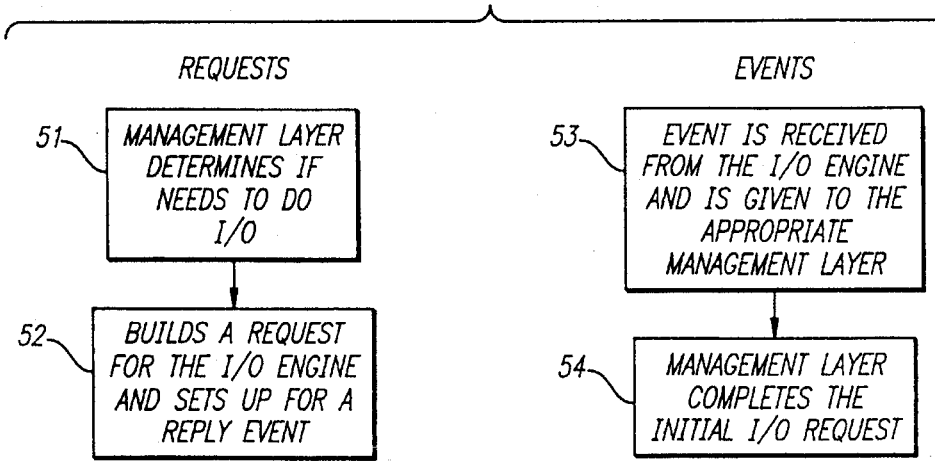
FIG. 4A is a flow diagram illustrating OS engine operation during execution of requests and events.
Figure 4B:
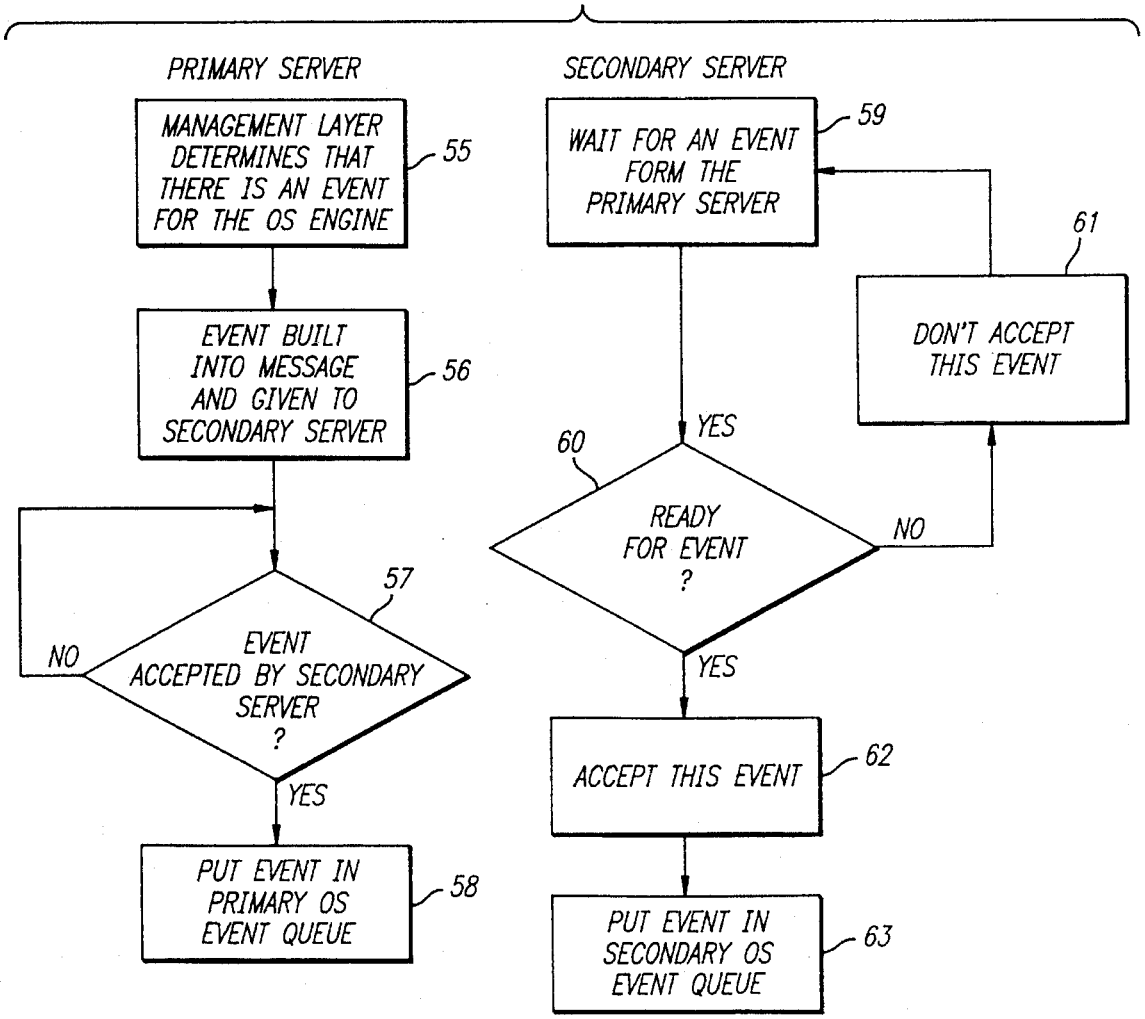
FIG. 4B is a flow diagram illustrating operation of primary and secondary I/O engines during execution of events.
Figure 4C:
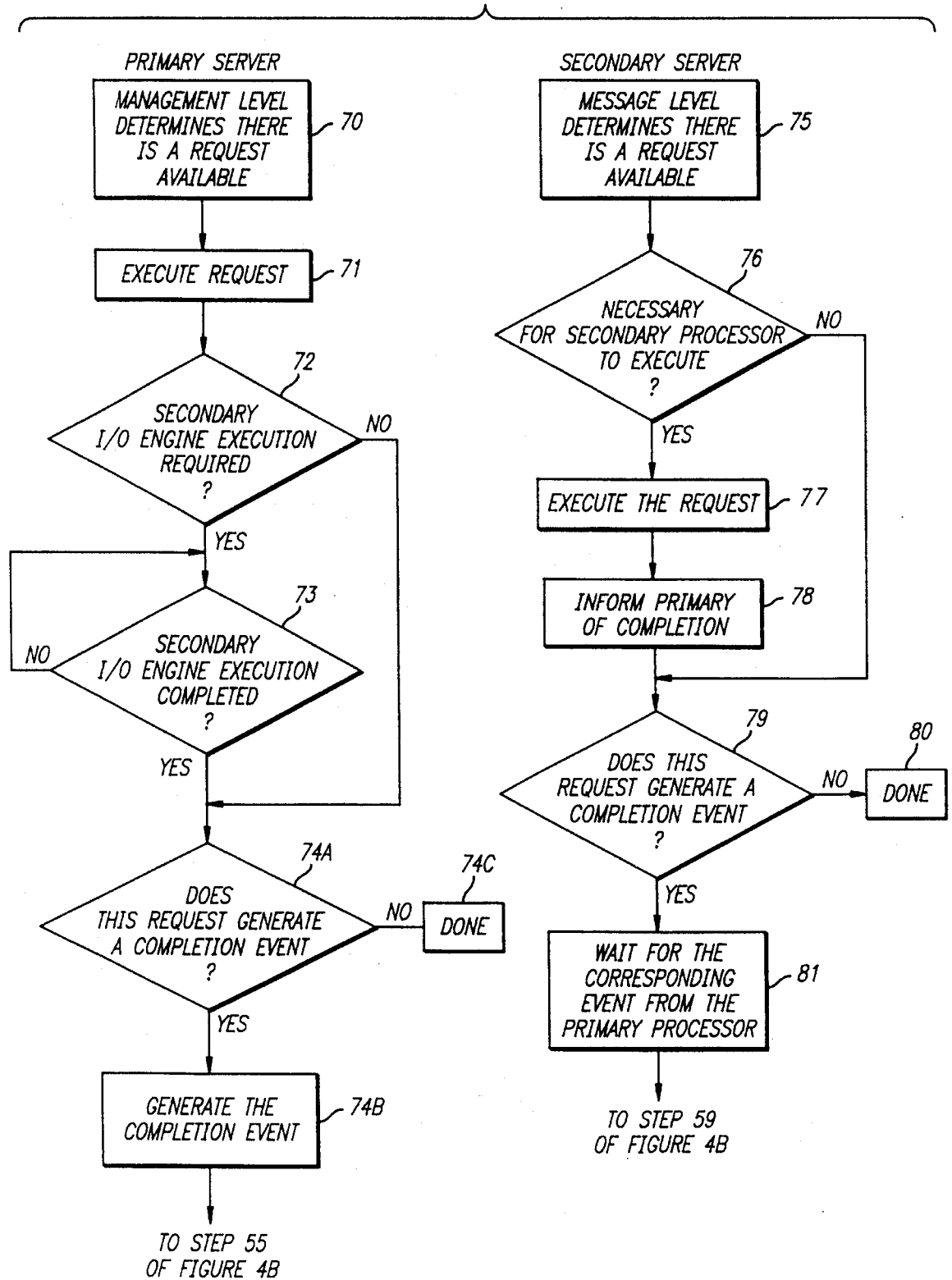
FIG. 4C is a flow diagram illustrating operation of primary and secondary I/O engines during execution of requests.

A flow diagram illustrating the execution of events and requests is illustrated in FIGS. 4A–4C. Referring first to FIG. 4A, the operation of the OS engines is illustrated.

The operation of the OS engine when it generates a request is shown at steps 51 and 52. The operation of the OS engine when it receives an event is shown at steps 53 and 54. At step 51, the management layer of the OS engine determines that there is a need to perform an I/O operation. At step 52, the OS engine generates a request for the I/O engine and enters a wait mode, waiting for a reply event from the I/O engine.

At step 53, an event is received from the I/O engine in the event queue of the OS engine. The event is given to the appropriate management layer block such as the disk block, LAN block, keyboard block, etc. At step 54, the management layer completes the initial I/O event by matching it with the original request.

A flow chart illustrating the operation of the I/O engine during event processing states is illustrated in FIG. 4B. Steps 55–58 illustrate the primary I/O engine and steps 59–63 illustrate the secondary I/O engine. At step 55, the management layer of the primary I/O engine determines there is an event for the OS engine. At step 56, this event is built into a message and communicated to the secondary I/O engine. The primary I/O engine then waits until the secondary I/O engine has acknowledged the event before providing the message to the primary OS engine. At decision block 57, a decision is made as to whether the event has been accepted by the secondary OS engine. If the event has not yet been accepted, the primary I/O engine waits until acknowledgement has been made. If the secondary I/O engine has accepted the event, satisfying the condition of decision block 57, the I/O engine places the event in the primary OS engine event queue at step 58.

The secondary I/O engine, at step 59, waits for an event frown the primary I/O engine. At decision block 60, the secondary I/O engine determines whether it is ready for the received event. If the secondary I/O engine is not ready, it sends a don't accept message to the primary I/O engine at step 61 and returns to step 59 to wait for another event. If the secondary I/O engine is ready to take the event, and the conditions at decision block 60 are satisfied, the secondary I/O engine sends an acknowledgement of the event to the primary I/O engine at step 62. The secondary I/O engine then places the event in the secondary OS engine event queue at step 63.

FIG. 4C illustrates the processing state of the I/O engine when processing requests generated by the OS engine. Steps 70–74 illustrate the state of the primary I/O engine during these operations and steps 75–81 illustrate the secondary I/O engine during these operations. At step 70, the message level of the I/O engine determines that there is a request available in the request queue. At step 71, the request is executed by the I/O engine. This request may be a disk write operation, send a packet on the LAN, etc. At decision block 72, it is determined whether execution of the request by the secondary I/O engine is also required. If no other execution is required, the primary I/O engine proceeds to step 74. If a secondary execution is required, the primary I/O engine proceeds to decision block 73. If the secondary processor is completed, the primary I/O engine proceeds to step 74A. If the secondary step is not completed, the primary I/O engine waits until the secondary step has been completed. At decision block 74A, determination is made as to whether the request generates a completion event. If the answer is yes, the primary I/O engine proceeds to step 74B and generates the completion event. If a completion event is not required, the primary I/O engine proceeds to step 74C and is done.

At step 75, the secondary I/O engine message level determines that there is a request available front the OS engine. At decision block 76, determination is made as to whether the secondary processor is required to execute the request. If the secondary I/O engine is to execute the request, a secondary I/O engine proceeds to step 77 and executes the request. After execution of the request, the secondary I/O engine informs the primary I/O engine of completion. If the secondary I/O engine is not to execute the request, the secondary I/O engine proceeds to decision block 79 mid determines whether the request generates a completion event. If there is no completion event generated by the request, the secondary I/O engine proceeds to step 80, and is done. If the request does generate an event, the secondary I/O engine awaits the corresponding event from the primary I/O engine at step 81.

Server Synchronization Sequence

During the synchronization of the secondary system with the primary system, the entire "state" of the OS engine, as well as the state of the primary I/O engine pertaining to the state of the OS engine, must be communicated to the secondary system. To initiate the synchronization of the primary and secondary systems, the primary OS engine system is "starved" of new events. That is, no new events are provided to the event queue of the primary system. After the message queue of the primary system is empty, the primary system OS engine loops, waiting for a new event. When the OS engine is waiting for a new event, it again is in a stable state and remains consistent until a new event is encountered. The entire state of the OS engine is then contained in the memory image of the OS engine; the memory image is then simply transferred to the secondary system. Eventually, both of the OS engines are given the same set of new events and begin mirroring each other.

Figure 6:
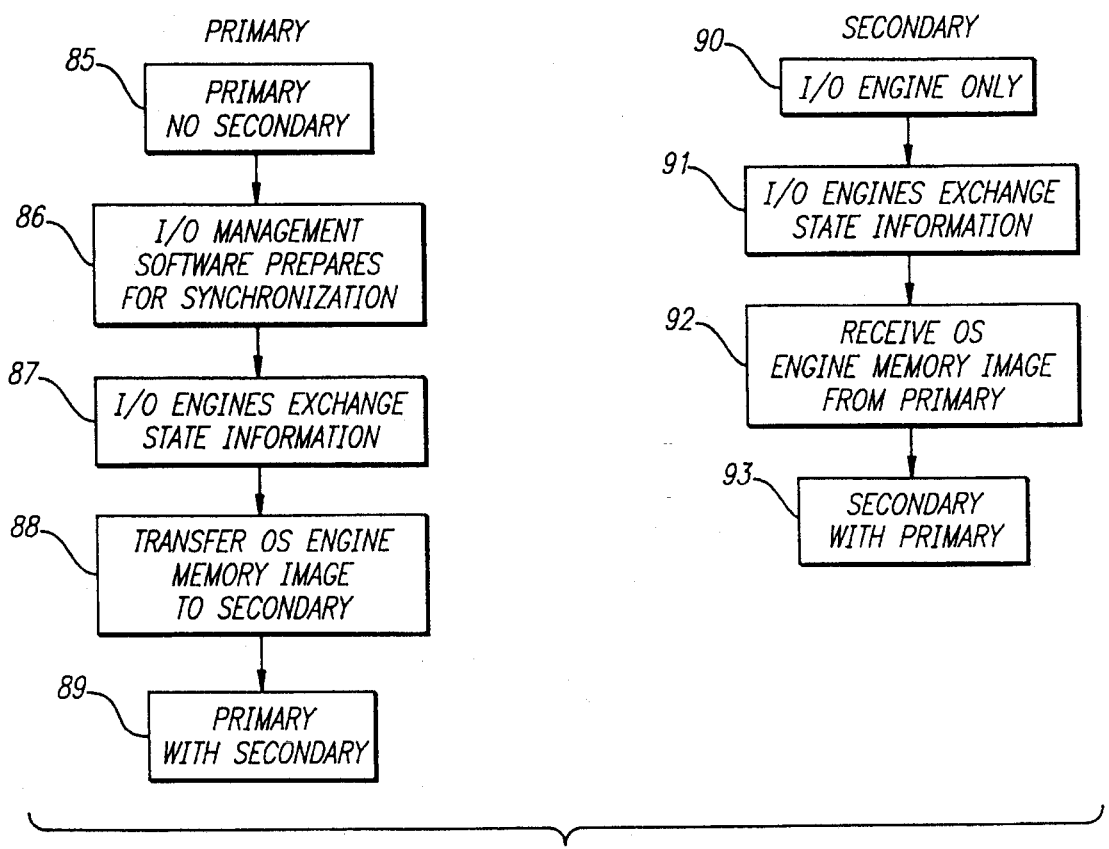
FIG. 6 is a flow diagram illustrating primary and secondary system synchronization.

A flow diagram illustrating the synchronization sequence of this invention is illustrated in FIG. 6. Steps 85–89 represent the states and transitions of the primary server. Steps 90–93 represent the states and transitions of the secondary server. The primary server is initially at state S2 at step 85 and the secondary server is initially at state S1 (I/O engine only) at step 90.

The I/O engines coordinate the synchronization sequencing. When the servers are given a command to synchronize, the management software of the primary I/O engine prepares for synchronization at step 86. This allows the various driver support layers to communicate with the OS engine and complete any tasks that would prevent synchronization. The primary system starts "starving" the OS engine and stops taking requests from the OS engine, as well.

Next, any outstanding requests that are being executed by the I/O engine are completed (and the appropriate completion event transferred to the OS engine memory image but is hidden and not given at this time to the OS engine). At step 87 and 91, the I/O engines exchange state information. The primary I/O engine provides its state information to the secondary I/O engine so that the I/O engines are aware of the state of each other plus the secondary I/O engine becomes aware of any outstanding state from the OS engine. This step is represented by step 91 of the secondary I/O engine sequence.

At step 88, the primary I/O engine transfers the OS engine memory image to the secondary server. This corresponds to step 92 of the secondary server sequence in which the secondary I/O engine receives the OS engine memory image from the primary server.

At step 89, the synchronization is complete and the primary system is in state S3, (primary with secondary). Similarly, corresponding step 93 of the secondary server, the synchronization process is complete and the secondary server is in state S4.

There can be server or communications failures during the synchronization sequence. If the primary system fails or the server-to-server communication link fails, the secondary system must quit as well. If the secondary system fails or if the communication link fails, the primary system must recover and return back to the "PrimaryNoSecondary" S2 state. These failures are signaled at different times during the synchronization sequence. After the change happens, the hidden and queued up events are given back to the OS engine and the I/O engine starts processing requests from the OS engine again. If a failure occurs during synchronization, the I/O engine management software needs to undo whatever changes have been done to synchronize and return back to the non-mirrored state.

Transition due to Primary Server Failure

When the primary system fails, the secondary system must be able to step in and assert itself as the server, with the only thing that changed being the LAN communications route to reach the server. Packets being sent to the server at the time of failure can be lost. However, all LAN communication protocols must be able to handle lost packets. The secondary I/O management support layers are notified of the failure.

When the failure occurs, the driver support layers need to take any outstanding requests they have front the OS engine and complete executing them. The secondary-turned-primary system's AddFSEvent procedure is activated prior to the failure notification so that new events can be given to the OS engine. Any messages being sent to the former primary system are discarded. Any requests from the OS engine that were waiting data or completion status from the primary system are completed as is. There is a need to use a special event to notify the OS engine that the servers were changed. For example, a special event is used to tell the OS engine to send a special control packet to all of the clients, indicating that the change occurred. This can accelerate the routing level switchover to the new server.

Transition due to Secondary Server Failure

When there is a secondary system failure, all messages queued to be sent to the secondary system are discarded. If the messages are OS engine events, they are simply provided to the OS engine. The driver support layer of the I/O engine completes any requests that were waiting pending notification from the secondary system.

Multiple OS Engines and Extra Processors

Figure 7:
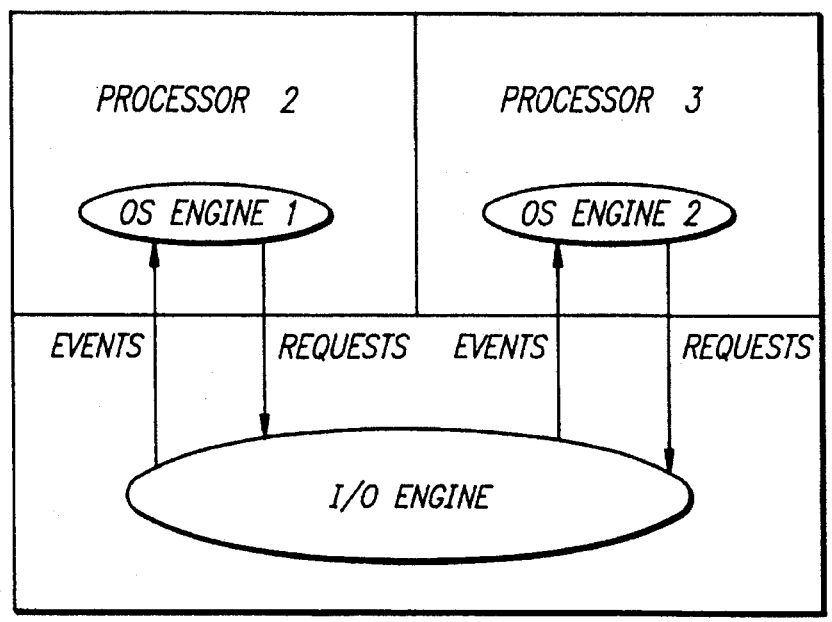
FIG. 7 is a block diagram of an alternate embodiment of this invention.
Figure 7:
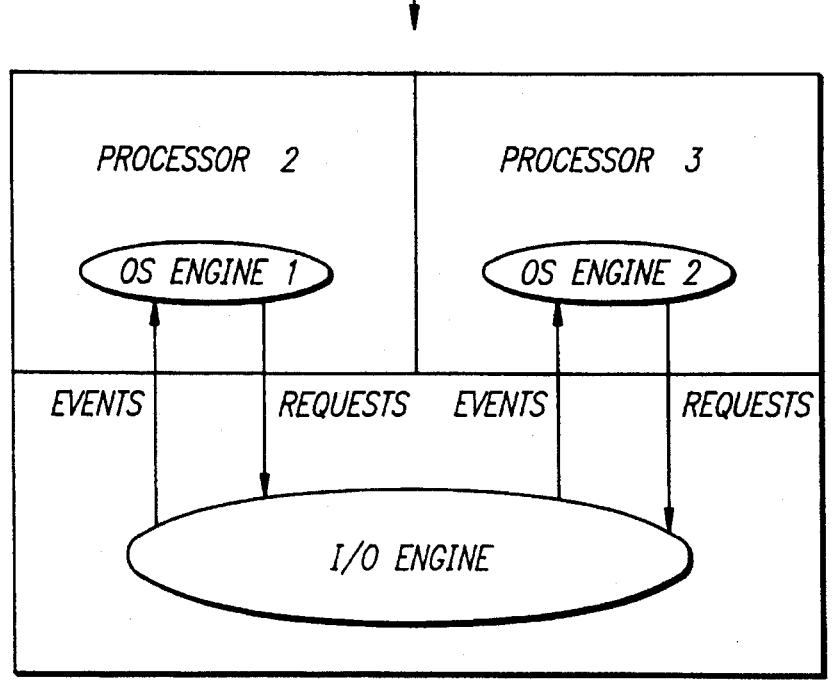

The present invention has been described in terms of primary and secondary servers that each have a single OS engine. An alternate embodiment of the present invention is illustrated in FIG. 7 in which the primary and/or secondary server can have one or more OS engines. Referring to FIG. 7, the primary server is comprised of three processors. Processor 1 implements the I/O engine of the primary server. A first and second OS engine are implemented on processor 2 and processor 3, respectively.

Similarly, the secondary server has a first processor implementing an I/O engine and second and third processors implementing first and second OS engines. In operation, multiple event queues are maintained for each OS engine so that each OS engine operates on the same events. In this manner, the states of each OS engine can be maintained substantially identical so that upon failure of one server, another can begin operation.

Thus, a fault tolerant computer system has been described.

We claim:

1. A method of disk mirroring in a computer system, comprising the steps of:

providing a first processing means for operation of said computer system;

providing a second processing means for operation of said computer system;

providing said first processing means with primary mass storage;

providing said second processing means with secondary mass storage;

providing a first manager for control of said primary mass storage;

providing a second manager for control of said second mass storage;

synchronizing said primary mass storage and said secondary mass storage using said first manager and said second manager;

marking said primary mass storage and said secondary mass storage with a current synchronization level counter value to indicate that said primary mass storage and said secondary mass storage are fully synchronized;

changing said current value synchronization level counter when there is a change to synchronization state.

2. The method of claim 1 further including the steps of:

determining whether both processing means will perform a disk operation using said first manager;

completing said disk operation by said first processing means and waiting until it has received completion confirmation from said second processing means when both I/O engines perform said disk operation;

determining by said first manager which processing means will perform said disk operation when said first manager determines that only one processing means will perform said disk operation;

transferring data by the processing means that performs said disk operation to the other processing when only one processing means performs said disk operation.

3. The method of claim 1 wherein said first processing means tracks which memory blocks have been changed.

4. The method of claim 1 further including the steps of:

changing said current synchronization level counter value by a surviving processing means upon the failure of the other processing means;

tracking memory blocks written to disk by said surviving processing means;

verifying that the failed processing means has the same data as before said failure upon said failed processing means being brought back on line;

synchronizing a repaired processing means by transfer to said repaired processing means the memory blocks that were changed while it was out of service.

5. A method for executing an operation in a fault tolerant computer system comprising the steps of:

providing a first processing means for operation of said computer system, said first processing means comprising a first operating system (OS) engine and a first input/output (I/O) engine;

generating a request by said first OS engine to said first I/O engine and said first OS engine waiting for a reply from said first I/O engine;

executing in said first I/O engine the requested operation as specified by said request and matching an initial I/O event by matching it with said request.

6. The method of claim 5 further including the steps of:

providing a second processing means, said second processing means comprising a second operating system (OS) engine and a second input/output (I/O) engine;

determining by said first I/O engine that there is an event for said first OS engine;

building said event into a message by said first I/O engine and communicating said message to said second I/O engine;

waiting by said first I/O engine until said second I/O engine accepts said message before providing said message to said first OS engine;

accepting said message from said first I/O engine by said second I/O engine if said second I/O engine is ready;

sending an acknowledgement of said message by said second I/O engine to said first I/O engine and placing said event in the event queue of said second OS engine;

placing the event in the event queue of said first OS engine after acceptance of said message by said second I/O engine;

executing said event by said first I/O engine;

determining if said event should be executed by said second processing means;

waiting by the first I/O engine for the completion of said event by said second processing means if secondary execution is necessary;

executing said request by said second processing means if said secondary execution is necessary;

informing said first I/O engine of completion of said request by said second processing means if said secondary execution is necessary;

determining by said first I/O engine if said event generates a completion event;

generating said completion event by said first I/O engine if said completion event is necessary;

waiting by the second I/O engine for said completion event from said first I/O engine if said completion event is necessary.

7. A method for synchronous management of timer interrupts, comprising the steps of:

providing a first processing means for operation of a computer system, said first processing means comprising a first operating system (OS) engine and an input/output (I/O) engine;

defining a timer interrupt as an event;

placing said timer interrupt in an event queue;

relinquishing control of said first OS engine by a task currently running on said first OS engine;

executing said first timer interrupt by said first OS engine when said OS engine reaches a message in said event queue.

8. A method of defining the states of a fault tolerant computer system comprising the steps of:

providing a first processing means for operation of said computer system, said first processing means comprising a first operating system (OS) engine and a first input/output (I/O) engine;

providing a second processing means, said second processing means comprising a second operating system (OS) engine and a second input/output (I/O) engine;

providing a first state to define the status of the fault tolerant computer to identify when said first engine is operational but said first engine is not operational called No Server Active State;

providing a second state to define the status of the fault tolerant computer to identify when said first I/O engine is operational but said second I/O engine is not called Primary System With No Secondary State;

providing a third state to define the status of the fault tolerant computer to identify when said first I/O engine is running in a mirrored primary system;

providing a fourth state to define the status of the fault tolerant computer to identify when said first I/O engine is running in a mirrored secondary system;

allowing a transition from said first state to said second state when said first OS engine is activated;

allowing a transition from said second state to said third state when said first processing means is synchronized with said second processing means;

allowing a transition from said first state to said fourth state when said second OS engine is synchronized with said first processing means;

allowing a transition from said fourth state to said second state when said first processing means fails;

allowing a transition from said third state to said second state when said second processing means fails.

\* \* \* \* \*

UNITED STATES PATENT AND TRADEMARK OFFICE
CERTIFICATE OF CORRECTION

PATENT NO. : 5,455,932
DATED : October 3, 1995
INVENTOR(S) : Major et al.

It is certified that error appears in the above-indentified patent and that said Letters Patent is hereby corrected as shown below:

Column 14, line 64, after "current", delete "value";

Column 14, line 64, after the word "counter", insert --value--;

Column 15, line 28, after the word "system", insert --,--;

Column 16, line 18, after the word "and", replace "an" with --a first--.

Signed and Sealed this

Ninth Day of April, 1996

Attest:

BRUCE LEHMAN

Attesting Officer

Commissioner of Patents and Trademarks